United States Patent
Adams

[11] 3,734,483
[45] May 22, 1973

[54] RECOVERABLE SHOCK MOUNTS

[75] Inventor: John Adams, Watford, England

[73] Assignee: S.G. Brown Limited, Watford, England

[22] Filed: May 10, 1971

[21] Appl. No.: 141,701

[30] Foreign Application Priority Data

May 12, 1970 Great Britain.................22,947/70

[52] U.S. Cl..................................267/65, 267/124
[51] Int. Cl. ..............................................F16f 5/00
[58] Field of Search.....................267/124, 126, 127, 267/65

[56] References Cited

FOREIGN PATENTS OR APPLICATIONS 1,180,759  6/1959  France .............................267/126

*Primary Examiner*—James B. Marbert
*Attorney*—Young & Thompson

[57] ABSTRACT

A recoverable shock mount for mounting gyroscope and like apparatus against shock comprises a cylinder connected to the vessel or other support for the apparatus, and containing a face seal plate connected to the apparatus by a piston rod. Fluid normally urges the plate against one end of the cylinder with a force in moderate excess of that required for support, but after displacement under shock restores the plate under a lower excess force. The mount may be responsive to compressive or tensile shock or to both. A plurality of the mounts may be interconnected so that all collapse in response to the collapse of one, to preserve the apparatus against tilt.

17 Claims, 4 Drawing Figures

INVENTOR
JOHN ADAMS
By Young & Thompson
ATTYS

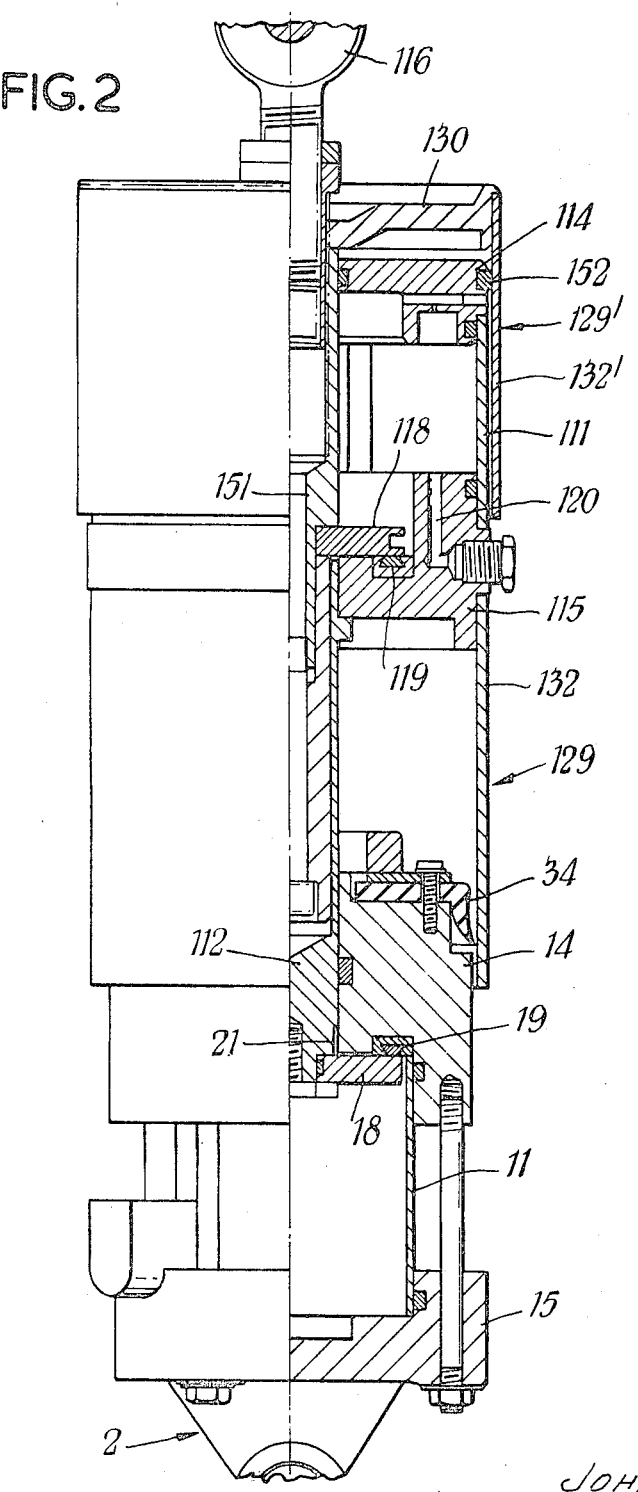

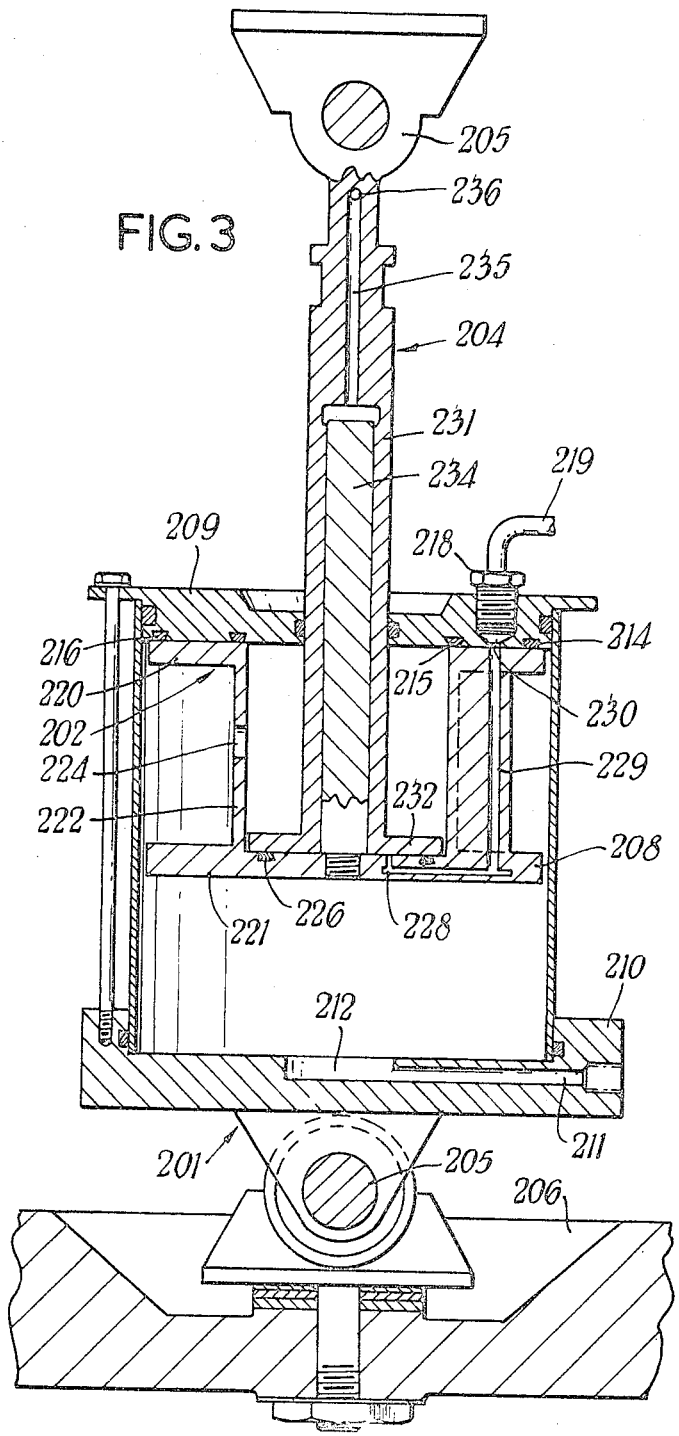

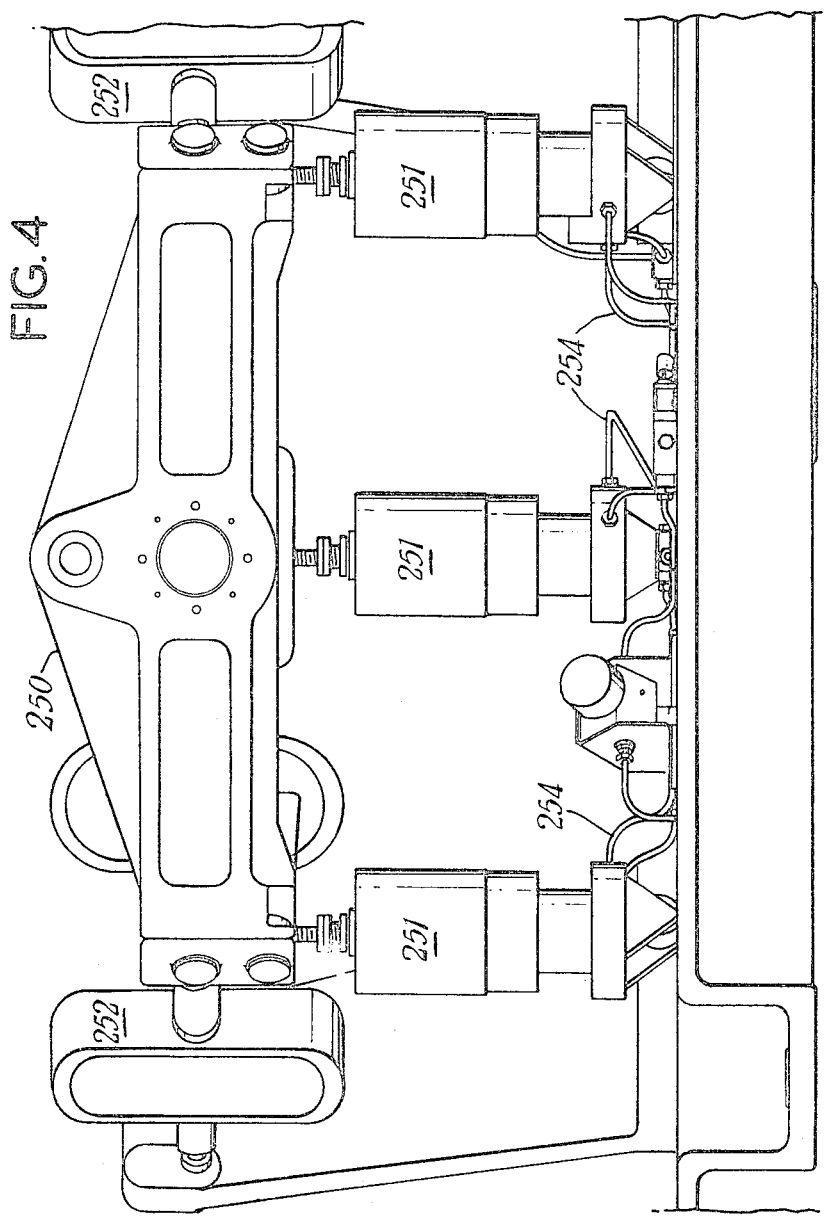

RECOVERABLE SHOCK MOUNTS

The invention relates to shock mounting arrangements.

Shock mounts are required for example for mounting apparatus such as gyroscope reference apparatus in naval vessels or military vehicles. If such a vessel is subject to shock, due to an explosion for example, some of the shock energy may be transmitted to the apparatus and damage it. Conventional shock or antivibration mounts are not normally "recoverable" in that they generally suffer some permanent distortion after a shock has been applied so that the apparatus being supported assumes a slightly different position, relative to the frame of the vessel, after the shock has occurred. For some apparatus, such as electronic equipment, this may not be of consequence, but it may be essential to ensure that gyro reference platforms and the like are restored precisely to the original working position after a shock has been experienced.

The object of the invention is therefore to provide an improved shock mount.

The invention accordingly provides a recoverable shock mount for mounting a device on a support, the mount having two relatively movable parts for connection with the device and the support respectively, the parts being arranged to maintain a normal relative position under a force in excess of that required to support the device, but to be displaced from the normal relative position under a predetermined shock and to be restored thereto after experiencing such a shock by a force which is less than the first-mentioned force.

The device is thus 'recoverable' in that it reverts to its original condition after experiencing a shock.

The use of a lower excess force for recovery of the normal length of the mount, the return movement being preferably also damped, ensures a prompt but smooth restoration of the supported load to the normal position after shock. The mount can be made single acting, that is, responsive either to compressive forces or to tensile forces only, or it can be double-acting, that is, responsive to both compressive and tensile forces.

The invention also provides a recoverable shock mounting system in which a plurality of these devices are interconnected so that upon operation of one in response to shock, the others are operated also. Such an arrangement tends to preserve the apparatus supported by the system against tilt, which can be valuable in the case of gyroscopic apparatus in that loss of gyroscopic memory by "toppling" may be prevented.

The invention will be better understood from the following illustrative description and the accompanying drawings, in which:

FIG. 2 is a part-sectional side view of a first double acting shock mount embodying the invention;

FIG. 3 is a sectional side view of a second double acting shock mount embodying the invention; and FIG. 4 is a side view of a shock mounting system incorporating three of the shock mounts shown in FIG. 1.

Figure 1:
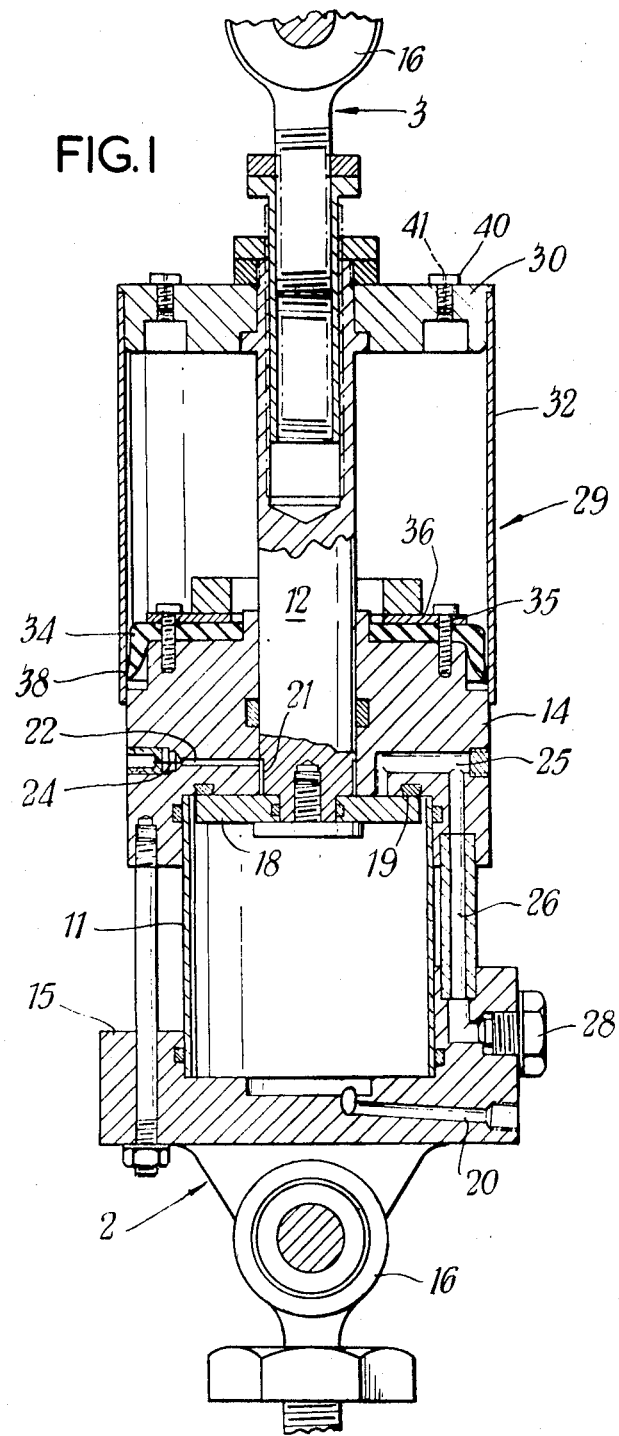
FIG. 1 is a sectional side view of a single acting recoverable shock mount embodying the invention.

The recoverable shock mount shown in FIG. 1 is a single acting compression shock mount comprising a base member 2 and an upper member 3. The base member 2 includes a main cylinder 11 with top and lower end walls 14, 15. The upper member 3 includes a piston rod 12 slidably received through a main bore in the top wall 14. The free end of the piston rod 12 and the other end wall 15 of the cylinder 11 are each provided with ball and socket or other universal joints 16. Inside the cylinder 11, the rod 12 carries a face-seal plate 18 which is slightly peripherally spaced from the curved cylinder wall but which can seal against an O-ring seal 19 set in the lower face of the first end wall 14. The end wall 15 is formed with a passage 20 through which liquid or gas can be introduced under pressure into the cylinder interior. The piston rod 12 has a short portion 21 of reduced diameter adjacent the plate 18 defining a space within the main bore which communicates with a transverse bore 22 in the first end wall. The bore 22 is connected to atmosphere through a restriction 24. A passage 25 in the end wall 14 radially inwards of the seal 19 vents the thin annular space bounded in the illustrated position of the mount by the lower face of the end wall 14, the plate 18, and the seal 19. The passage 25 communicates through a passage 26 with an external connection 28. The purpose of the passage 25 will be explained below. The mount will operate as intended if the passage 25 is closed, as by a plug in the connection 28.

At a position spaced from the end wall 14 in the illustrated position of the mount, the piston rod 12 carries a cover 29 comprising a plate 30 closing one end of a tube 32 having the first end wall 14 slidably received in its other end. An annular rubber seal 34 secured on top of the wall 14 by bolts 35 and a retaining ring 36 has an out-turned lip 38 such as to permit air to escape from the tube 32 quite readily on downward movement of the cover 29 but to tend to oppose inward movement of air on reverse movement. To further facilitate and control air movements into and out of the cover 29, bolts 40 having fine central ducts 41 are set in holes in the plate 30 and there can also be provided a flap or other outwardly opening non-return valve (not shown). The cover 29 thus offers substantially no opposition to collapse of the mount but damps return movement to the position shown.

The mount is preferably used with the cover 29 upwards as shown, the base member 2 being connected to a frame or support frame and the upper member 3 being connected to the load or apparatus to be mounted. Air or other fluid pressure is supplied to the cylinder 11 such that the plate 18 is urged upwardly with a force equal to the effective area of the plate multiplied by the pressure difference between its lower and upper faces. The pressure and dimensions are chosen so that this force is in moderate excess of that required to support the load, being for example equivalent to $6w$ where $w$ is the normal weight of the portion of the load supported by the mount. The apparatus is thus very adequately supported.

To understand the operation of the mount, suppose a compression shock, that is, a shock which causes the support and the base member 2 to accelerate upwards to occur. If the shock exceeds $6g$, it will unseal the plate 18 from the O-ring seal 19 and thus vent the interior of the cylinder 11 to the annular space above the plate. This causes the pressure above the plate 18 to rise, thus reducing the force between the base 2 and the upper member 3. This pressure change takes place in a very short time, as to be substantially uneffected by the vent 22, because of the restriction 24. In any event, at the same time as the plate 18 is displaced from the seal 19, the vent 22 is closed, because of the limited axial length of the reduced diameter portion 21 of the rod 12, so preventing escape of the compressed fluid in the cylinder 11.

The resulting force on the piston rod is now equal only to approximately $1.3w$ to $1.5w$, so that the normal load on the mount is exceeded by $0.3w$ to $0.5w$. After passage of the shock force, the mount will be expanded by this smaller net force against the damping forces due to the cover 29. The recovery to the normal position is therefore relatively gentle. When the shock has passed and the mount extended until the plate 18 engages the seal 19, the vent 22 is at the same time opened to atmosphere. The vent 22 thus ensures that the pressure in the annular space above the plate 18 fills to atmospheric pressure at the end of the recovery stroke and is maintained there in spite of any microscopic leak past the seal 19.

It will be evident that the invention can be readily embodied in a single acting tensile mount which will extend under tensile shock forces, that is, forces due to a shock causing the base member 2 to move downwardly. It is also possible to embody the invention in a double acting mount which provides both functions. Such a mount is illustrated in FIG. 2, the lower part of which corresponds in essentials to the arrangement of FIG. 1 and thus provides for recoverable collapse of the mount in the event of compressive shock. Components of the mount of FIG. 2 which are identical to those of the mount of FIG. 1 are given the same reference numerals.

The double acting mount shown in FIG. 2 has an upper cylinder 111 closed by upper and lower end walls 114, 115. The lower wall 115 is secured to a downwardly extending tubular portion 129 to constitute a damping cover 129 functioning in the same way as the cover 29 of FIG. 1. The piston 18 of the lower part of the mount, operable on compressive shock, is secured to the lower end of a piston rod 112 to the upper part of which the lower end wall 115 is secured. The rod 112 is hollow and in inner piston rod 151 is received slidably therein. The inner rod 151 has secured thereto a face seal plate 118 which engages in the illustrated normal position of the mount with an O-ring seal 119 in the upper surface of the lower end wall 115. At its upper end, the rod 151 is provided with a ball and socket joint 116 by which the mount is connected to the device to be supported.

The plate 118, in the position shown, seals a vent (not shown) for the interior of the cylinder 111, the vent having a port in the wall 115 inwardly of the seal 119. The plate 118 is normally maintained in the lowermost position shown by fluid pressure introduced through an inlet passage 120. The vent passage may again be provided with an outlet connection (not shown) corresponding in function (not yet described) to the outlet connection 28 of FIG. 1.

The inner piston rod 151 carries at its free end a cover 129' comprising a plate 130 which closes the end of a tubular portion 132' the inner surface of which makes a sliding seal with a seal ring 152 received in a peripheral recess in the wall 114. The cover 129' is provided with flap valves or other means (not shown) for controlling the ingress and outflow of air therefrom such that upward movement of the piston rod 151 is effectively undamped, but return movement is damped.

If the mount of FIG. 2 undergoes a tensile shock by which more than a predetermined force acts downwardly on the base portion 2, the plate 118 is displaced from the end wall 115 of the cylinder 111 and compressed air or other fluid escapes past the seal 119 and equalizes the pressure difference previously existing on the opposed sides of the plate 118. Again, return movement occurs under reduced excess pressure and is damped by the cover 129'.

If the double acting mount of FIG. 2 is used with its axis vertical, the recovery forces for return to the normal length illustrated differ depending on whether the mount has been extended or contracted, because of the bias due to gravity. For recovery from extension, the force acting on the piston 118 is arranged to be between $0.7w$ and $0.5w$ in a direction to lift the supported device. The supported device will thus slowly sink back to its normal position after a tensile shock has passed under a net force of between $0.3w$ and $0.5w$. If the double-acting mount is used with its axis horizontal, the recovery forces must be made the same for both extension and compression, preferably between $0.3w$ and $0.5w$ because there is no bias due to gravity.

The double acting mount illustrated in FIG. 3 comprises a base member 201, an intermediate member 202 and an upper member 204. The base and upper members 201, 204 are secured by ball and socket joints, 205, or in any other suitable way, to a support structure 206 and a device to be supported respectively.

The base member 201 comprises a hollow cylinder 208 with upper and lower end walls 209, 210. The lower end wall 210 is provided with an inlet passage 211 for pressure fluid communicating with the cylinder interior by a large diameter axial port 212. The upper end member 209 is provided with an orifice 214 located between a concentric pair of O-ring seals 215, 216 and connected through a union 218 to a pipe 219. This can connect through a restriction to atmosphere.

The intermediate member 202 is slidable within the cylinder 208 and comprises an upper annular face seal plate 220 and a lower face seal plate 221 both spaced from the inner surface of the cylinder 208 over part of their peripheries. Fluid can therefore flow round the edges of both plates, a damping effect being provided, depending on the area between the plate peripheries and the tubular portion 208. The plate 220 and 221 are spaced apart by a concentric tubular portion 222 having an aperture 224. The portion of the lower plate 221 within the tubular portion 222 has an O-ring seal 226 in its upper surface and a port 228 radially inwards of the seal communicating through a passage 229 with a port 230 in the upper surface of the upper plate 220.

The upper member 204 comprises a piston rod 231 slidably received in a central bore in the end wall 209 and having at its lower end a flange constituting a face seal plate 232 movable within the tubular portion 222 and peripherally spaced therefrom. The rod 231 is hollow and receives a cylindrical piston 234 projecting upwardly from the center of the lower plate 221 of the intermediate member 202.

At the upper end of the piston rod 231, the hollow interior communicates through a passage 235 with a vent 236 to atmosphere.

In considering the operation of the device reference will be made to radius $r_1$ of the cylindrical piston 234, to radius $r_2$ of the rod 231, to $r_3$, the effective radius of the plate 232, that is, the radius of the seal 226, to $r_4$ and $r_5$ respectively the effective inner and outer radii of the plate 220, that is, the radii of the seals 215 and 216, and to P the pressure of the fluid supplied through the inlet 211 to the interiors of the cylinder 208 and the tubular portion 222.

The illustrated position of the apparatus will be undisturbed by a compressive shock unless the upward force on the lower member 201 exceeds that on the plate 220, that is, $P\pi(r_5^2 - r_4^2)$. The selected values are such that the force equals that which the mount is intended to collapse, normally a small multiple, for example, 6, of the weight supported by the mount. As soon as a collapse occurs, the narrow annular space between the upper surface of the plate 220 and the lower surface of the wall 209 is no longer sealed. During collapse there is an upthrust on the intermediate and upper members 202, 204, because of the piston 231, equal to $P\pi r_2^2$. The value of $r_2$ is chosen, for example, so that $P\pi r_2^2$ equals 1.5 times the normal weight supported by the mount. Thus, when the shock force has ended, this force is sufficient to restore the mount to its normal position.

Under tensile shock, the downward force applied to the base member 201 will be opposed by the force between the plate 232 and the upper surface of the plate 221, equal to $P\pi(r_3^2 - r_2^2)$. When collapse occurs, the space between the lower surface of the plate 232 and the upper surface of the plate 221 is no longer sealed by the seal 226, so that the plate 232 no longer provides an effective support area. After the shock force has ended, the lower and intermediate members 201, 202 move as one to the normal position, under the upthrust $P\pi(r_2^2 - r_1^2)$ on the upper member. The restoring force acts against the weight of the load and can be selected to provide a net downward force of ½g.

Recoverable shock mounts embodying the invention may be connected between the mass or load to be supported and a frame or other support so as each to provide constraint in respect to one of the six degrees of freedom of the apparatus relative to the frame, and to collapse and or extend, depending on the nature of the mount, if the force between the end joints exceeds a predetermined value.

A system incorporating the mounts need not however provide constraint in respect to all degrees of freedom. For example, FIG. 4 shows a mounting system for use with a gyro reference unit 250 providing accurate pitch and roll outputs which affords accurate angular recoverability about the pitch and roll axes, but not about the azimuth axis. Three recoverable single acting shock mounts 251 of the kind illustrated in FIG. 1 are employed, each with its axis vertical. Three conventional shock mounts 252, with their axes horizontal and at 120° apart are used to control the apparatus in the horizontal plane. These are not accurately recoverable after horizontal shocks, but the arrangement illustrated will preserve the azimuthal alignment of the gyro relative to the base to within 1 or 2 degrees.

For a three axis gyro platform, a total of six recoverable mounts can be used to provide accurate angular reference about all three of the pitch, roll and azimuth axes. Such a system includes three horizontal recoverable mounts as well as three vertical ones. Double acting mounts are used in all six positions. Where a double acting mount is used horizontally, it is possible to provide spring means to simulate the gravity force necessary to the operation of the mount as described. Thus a helical spring around the mount can be arranged to act between the lower or upper parts 201, 204.

As mentioned previously, it is very desirable for gyroscopic apparatus to ensure not only a return after shock to the original position but to limit angular motion in tilt to about one or two degrees actually whilst the shock is being experienced. In accordance with the invention, this is achieved for the system of FIG. 4 by interconnecting all three of the connections 28 of the vertical shock mounts 251 by interconnections 254. When a shock impact occurs, generally one of the three mounts will 'break' before the others. Because of the interconnections however the air or other fluid pressure from the collapsed mount will be applied to the pistons of the other mounts within a few milliseconds. These other mounts will then also collapse and in this way, large tilting torques on the gyro apparatus are prevented and the apparatus is unable to assume a large angle of tilt during the few hundreths of a second duration of the shock.

In a similar way, all six of the double acting mounts of the system for use with a three axis gyro platform can be connected together. For example, the pipes 219 of the double acting mount of FIG. 3 can all lead to a common chamber providing the restricted connection to atmosphere previously mentioned. When a shock causes the collapse of one mount momentarily sooner than the others, the remainder will also collapse immediately afterwards. Rapid angular motion of the gyro platform over large angles is thus prevented.

I claim:

1. A recoverable shock mount for mounting an object on a support, the mount comprising a cylinder, a piston slidable within said cylinder, a piston rod secured to the piston and extending outwardly of the cylinder, means for connecting the cylinder to one of the object and the support, means for connecting the piston rod to the other of the object and the support, means for introducing fluid pressure into the cylinder to urge the piston against a cylinder end wall, the object and the support being then maintained in a normal relative position under a first force, means communicating the fluid pressure to both sides of said piston when the piston is displaced from said end wall under a shock displacement of the object and the support from the normal relative position, whereby the object and the support are restored to said normal relative position under a lesser force than said first force, and damping means for damping said restoring movement without substantially damping said shock displacement movement, said damping means comprising a cover secured to said piston rod, said cylinder being slidable in said cover, and sealing means operative between said cover and said cylinder, said sealing means being adapted to offer substantially greater resistance to flow of air between the interior of said cover and ambient atmosphere during said restoring movement than during said displacement movement.

2. A recoverable shock mount as defined in claim 1 in which said sealing means comprises an annular ring of resiliently flexible material having an out-turned lip adapted to be deflected from engagement with said cover by expulsion of air from said cover and to be urged into sealing engagement therewith by a decrease of pressure within said cover.

3. A recoverable shock mount as defined in claim 2 having means defining restricted passage between the interior of said cover and the ambient atmosphere.

4. A recoverable shock mount as defined in claim 1 in which said piston rod extends through the cylinder end wall against which said piston is urged in the normal relative position of said object and support, whereby the shock mount is responsive to compressive shock displacement.

5. A recoverable shock mount as defined in claim 1 in which said piston rod has a relieved section adjacent said piston, and in which passage means including a restriction is provided in said end wall communicating ambient atmosphere to said relieved section of said piston rod, whereby atmosphere is communicated to between the piston and said end wall when the piston is spaced from but adjacent said wall.

6. A recoverable shock mount as defined in claim 1 having means for connection to at least one other like mount to cause displacement of said mounts substantially together upon the displacement of one of the mounts.

7. A recoverable shock mount as defined in claim 6 in which said connection means comprises a passage in said end wall having a port opening into the cylinder at a position for the port to be normally closed by said piston.

8. A double-acting recoverable shock mount for mounting an object on a support, the mount comprising a first cylinder, a first piston slidable within said first cylinder, a first piston rod secured to the piston and extending outwardly of the cylinder through an end wall thereof, means for connecting the cylinder to the support, a second cylinder aligned with said first cylinder, the first piston rod being secured to the adjacent end wall of said second cylinder, a second piston slidable within said second cylinder, a second piston rod secured to said second piston and extending outwardly of said second cylinder through the other end wall thereof, means for connecting said second piston rod to said object, means for introducing fluid pressure into said first and second cylinders to act on said first and second pistons so as to urge the first piston against said first cylinder end wall and said second piston against said second cylinder adjacent end wall whereby the object and the support are maintained in a normal relative position under a first force, means communicating fluid pressure to both sides of said first piston when the first piston is displaced from said first cylinder end wall under a compressive shock displacement of the support towards the object, and means communicating fluid pressure to both sides of said second piston when the second piston is displaced from said second cylinder adjacent end wall under a tensile shock displacement of the support away from the object whereby the object and the support are restored to said normal relative position after either such shock displacement under a lesser force than said first force.

9. A recoverable shock mount as defined in claim 8 having first and second damping means effective to damp said restoring movements after compressive shock displacement and after tensile shock displacement respectively.

10. A recoverable shock mount as defined in claim 9 in which said second damping means comprises a cover in which said second cylinder is slidable, sealing means acting between said cover and said cylinder, and valve means permitting entry of air into said cover but opposing release of air therefrom.

11. A recoverable shock mount system for mounting an object on a support, the system having a plurality of shock mounts, each shock mount comprising a cylinder, a piston slidable within said cylinder, a piston rod secured to the piston and extending outwardly of the cylinder, means for connecting the cylinder to one of the object and the support, means for connecting the piston rod to the other of the object and the support, means for introducing fluid pressure into the cylinder to urge the piston against a cylinder end wall, the object and the support being then maintained in a normal relative position under a first force, means communicating the fluid pressure to both sides of said piston when the piston is displaced from said end wall under a shock displacement of the object and the support from the normal relative position, whereby the piston is restored against said cylinder end wall under a lesser force than said first force, and means interconnecting the mounts of the system to cause displacement of the pistons of all said mounts from the associated cylinder walls in response to such displacement of one of said pistons.

12. A recoverable shock mount system as defined in claim 11 in which said interconnecting means comprises a port in each cylinder end wall, said port being closed by the associated piston when against said end wall, and passage means interconnecting the ports of all the mounts.

13. A double-acting recoverable shock mount for mounting an object on a support, the mount comprising a first cylinder, an intermediate member slidable therein, the intermediate member comprising a first plate, an annular plate, and a tubular member axially spacing said first and annular plates apart, a piston rod extending through an end wall of the first cylinder, a piston carried by said piston rod and slidable within a second cylinder constituted by said first cylinder end wall, said tubular member and said first plate, means for introducing fluid pressure into the first and second cylinders to cause the annular plate to engage said first cylinder end wall and said piston to engage the first plate, means communicating fluid pressure to both sides of said annular plate on compressive shock displacement thereof from said first cylinder end wall whereby said annular plate is restored to engagement with said end wall under a force less than the force maintaining the engagement, and means communicating fluid pressure to both sides of said piston on tensile shock displacement thereof from said first plate whereby said piston is restored to engagement with said first plate under a force less than the force maintaining the engagement.

14. A double acting recoverable shock mount as defined in claim 13, having passage means providing restricted connection to atmosphere to between said annular plate and said first cylinder end wall and to between said piston and said first plate.

15. A double acting recoverable shock mount as defined in claim 14, having a concentric pair of sealing rings for sealing between said annular plate and said first cylinder end wall and a third sealing ring for sealing between said piston and said first plate, said passage means including a first port opening between said concentric pair of sealing rings and a second port opening within the area of said third sealing ring.

16. A recoverable shock mount for mounting an object on a support, the mount comprising a cylinder, a piston slidable within said cylinder, a piston rod secured to the piston and extending outwardly of the cylinder, means for connecting the cylinder to one of the object and the support, means for connecting the piston rod to the other of the object and the support, means for introducing fluid pressure into the cylinder to urge the piston against a cylinder end wall, the object and the support being then maintained in a normal relative position under a first force, means communicating the fluid pressure to both sides of said piston when the piston is displaced from said end wall under a shock displacement of the object and the support from the normal relative position, whereby the object and the support are restored to said normal relative position under a lesser force than said first force, and passage means providing restricted communication of atmosphere to between said end wall and said piston when said piston is urged against said end wall.

17. A recoverable shock mount as defined in claim 16 having a sealing means for sealing between said end wall and said piston, said passage means including a port in said end wall within said sealing means.

* * * * *